3,368,937
INJECTABLE SOLID STEROID-ANESTHETIC
Thomas J. Macek, Baederwood, and Robert Edward King, Doylestown, Pa., assignors to Merck & Co., Inc., Rahway, N.J., a corporation of New Jersey
No Drawing. Continuation-in-part of applications Ser. No. 221,865, Sept. 6, 1962, and Ser. No. 254,485, Jan. 28, 1963. This application Jan. 26, 1965, Ser. No. 428,215
12 Claims. (Cl. 167—52)

This application is a continuation-in-part of our earlier applications Ser. No. 221,865, filed Sept. 6, 1962, now abandoned and Ser. No. 254,485, filed Jan. 28, 1963, now abandoned.

This invention relates to an injectable steroid solution containing a 21-phosphate of an anti-inflammatory steroid such as dexamethasone 21-phosphate and containing also a local anesthetic. The steroid is one which is advantageously administered by intramuscular, intrasynovial, intra-articular and soft tissue injection.

In view of the severe inflammatory condition often present in rheumatoid arthritis, bursitis and even sprains and the like, the addition of a local anesthetic agent to aqueous solutions of the soluble steroids is advantageous since it minimizes pain on injection. Unfortunately, however, conventional local anesthetics such as cyclaine and procaine react with the 21-phosphate steroids, forming the addition salts procaine steroid 21-phosphate steroid or cyclaine 21-phosphate steroid, which salts are insoluble in water. For example, when equal volumes of 1% procaine hydrochloride aqueous solution and 0.4% aqueous solution of dexamethasone 21-phosphate are combined, precipitation occurs due to the insolubility of the local anesthetic base at the resulting pH of the combination. It is most undesirable to inject the precipitate, since the two active ingredients are not in solution and one would not be assured of rapidity of action, an important factor in the treatment of many conditions with steroids.

Further, dexamethasone 21-phosphate has an optimum pH of 7.4 and should be stored in solution at that pH (or slightly below) in order to insure stability over extended periods of time. Its pH range extends down to about 5.5, but the lower the pH becomes the more decomposition of the dexamethasone 21-phosphate is encountered. Since cyclaine is most stable at a pH of about 3, and is not suitable for use at a higher pH—it hydrolyses and loses its anesthetic properties—cyclaine is essentially incompatible with dexamethasone 21-phosphate. Similar comments apply to procaine.

For the foregoing reasons, it has been a common practice of physicians to inject the local anesthetic separately from the steroid—a procedure having obvious disadvantages.

It is an object of this invention to provide a compatible combination of an anti-inflammatory 21-phosphate steroid with a local anesthetic, which combination is quickly operative after injection and which combination is sufficiently stable that it may be stored for extensive periods of time up to two years or more, for example. Still another object is to provide a combination of the character indicated above, wherein the agents are mutually effective throughout a common pH range and do not react with one another to form a water-insoluble salt.

It has now been discovered that by administering a combined dosage of an anti-inflammatory 21-phosphate steroid and an aromatic amide selected from the group consisting of lidocaine and mepivacaine in specific proportions, the foregoing advantages are realized and the resulting combination having a pH in the range of about 6.0–6.5 has excellent shelf life for a period of over two years and constitutes a crystal-clear solution both ingredients of which are quickly effective upon co-administration. The proportions are, by weight, in the range of 1–20 to 4–1 of the anti-inflammatory 21-phosphate steroid to lidocaine or mepivacaine.

The anti-inflammatory 21-phosphate steroid compounds which may be used are represented as follows:

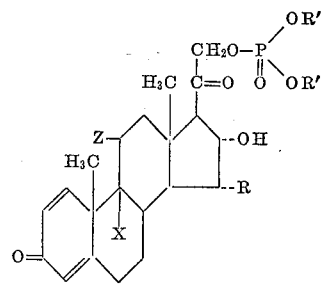

wherein X designates hydrogen or fluoro, Z designates a keto or hydroxy substituent, R designates hydrogen or methyl and R' designates hydrogen or sodium. They are the subject of a co-pending application, assigned to the assignee hereof, Ser. No. 642,655 filed Feb. 27, 1957, now abandoned, the disclosure of which is incorporated herein by reference.

These 1,4-pregnadiene steroid compounds are prepared by reacting phosphoric acid with the product obtained by contacting the corresponding 4-pregnene steroid compounds with the dehydrogenating activity of micro-organisms of the Class Schizomycetes, which includes micro-organisms belonging to the orders Actinomycetales and Eubacteriales. The preferred Eubacteriales include micro-organisms of the genus Acetobacter, the genus Aerobacter, and the genus Bacillus; the preferred Actinomycetales include micro-organisms of the genus Nocardia and the genus Mycobacterium.

The preferred anti-inflammatory steroid contemplated by this invention is dexamethasone 21-phosphate which chemically is the 21-phosphate of $16\alpha$-methyl-$9\alpha$-fluoro-1, 4-pregnadiene-$11\beta$, $17\alpha$, 21-triol-3, 20-dione. However, the term "anti-inflammatory 21-phosphate steroid" as used herein is intended to include dexamethasone 21-phosphate and the 21-phosphates of the following compounds and mixtures thereof:

$16\alpha$-methyl-1,4-pregnadiene-$11\beta$,$17\alpha$,21-triol-3,20-dione
$16\alpha$-methyl-1,4-pregnadiene-$17\alpha$,21-diol-3,11,20-trione
$16\alpha$-methyl-1,4-pregnadiene-$11\beta$,$17\alpha$,21-triol-3,20-dione
$16\alpha$-methyl-$9\alpha$-fluoro-1,4-pregnadiene-$17\alpha$,21-diol-3,11,20-trione
$11\beta$,$17\alpha$,21-trihydroxy-4-pregnene-3,20-dione (hydrocortisone)
$17\alpha$,21-dihydroxy-4-pregnene-3,11,20-trione (cortisone)
$11\beta$,$17\alpha$,21-trihydroxy-1,4-pregnadiene-3,20-dione, (prednisolone)
$17\alpha$,21-dihydroxy-1,4-pregnadiene-3,11,20-trione, (prednisone)

The anesthetic lidocaine is known chemically as 2-diethylamino-2',6'-aceto xylidide. It is prepared by the action of diethylamine on chloroacetyl xylidide as disclosed in U.S. Patent No. 2,441,498, granted 1948. It is separated in the form of needles from benzene or alcohol and is insoluble in water but is soluble in alcohol, ether, benzene, chloroform and oils. Its hydrochloride is freely soluble in water and lidocaine hydrochloride injection is usually prepared in solution by the action of dilute hydrochloric acid on a lidocaine base.

The anesthetic mepivacaine, which is structurally similar to lidocaine, is disclosed in the U.S. patent to Thuresson et al. No. 2,799,679, granted July 16, 1957 and has the following formula:

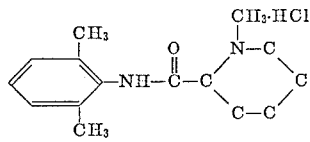

Its preparation and characteristics are fully set forth in that patent, the disclosure of which is incorporated herein by reference.

The following examples are illustrative of the invention.

Example 1

The following solution is ideally effective for administration and has a shelf life of at least two years at room temperature.

| | Weight in milligrams per milliliter of solution |
|---|---|
| Dexamethasone 21-phosphate disodium salt | 4 |
| Lidocaine base (equivalent to 10 mg. of lidocaine hydrochloride) | 8.93 |
| Creatinine | 8 |
| Sodium bisulfite | 2 |
| Sequestrene disodium (ethylenediaminetetraacetic acid disodium salt) | 0.5 |
| Phenol | 5.0 |
| Sodium hydroxide | 6.0 |
| Hydrochloric acid | 5.2 |
| Water for injection, to 1 mg. | |

The creatinine, sodium bisulfite and sequestrene disodium are stabilizers for the dexamethasone 21-phosphate, and the phenol is present as a bacteriological preservative.

The hydrochloric acid is effective in combination with the lidocaine base, producing a water-soluble product and the sodium hydroxide is utilized to neutralize excess hydrochloric acid in an amount to bring the pH to the highly preferred range of 6.2–6.3. At this pH the dexamethasone 21-phosphate and the lidocaine hydrochloride are mutually compatible and stable.

Example 2

| | Weight in milligrams per milliliter of solution |
|---|---|
| Dexamethasone 21-phosphte disodium salt | 4 |
| Lidocaine base (equivalent to 10 mg. of lidocaine hydrochloride) | 8.93 |
| Creatinine | 8 |
| Sodium bisulfite | 2 |
| Sequestrene disodium | 0.5 |
| Methylparaben (methylparahydroxybenzoate) | 1.5 |
| Propylparaben (propylparahydroxybenzoate) | 0.2 |
| Sodium hydroxide | 6.0 |
| Hydrochloric acid | 5.2 |
| Water for injection, to 1.0 mg. | |

Again, the pH is carefully adjusted to a preferred range of 6.2–6.3.

Example 3

The following example contains no specific preservatives but is entirely suitable for co-administration of dexamethasone 21-phosphate and lidocaine.

| | Weight in milligrams, per milliliter of solution |
|---|---|
| Dexamethasone 21-phosphate (as disodium salt) | 4 |
| Lidocaine base (equivalent to 5 mg. of lidocaine hydrochloride) | 4.5 |
| Sodium hydroxide | q.s. to pH 6.0–6.5 |
| Hydrochloric acid | 3 |
| Water for injection to make 1 cc. | |

Example 4

The following example shows a solution for injection containing a smaller dosage of dexamethasone 21-phosphate.

| | Weight in milligrams, per milliliter of solution |
|---|---|
| Dexamethasone 21-phosphate (as disodium salt) | 1 |
| Lidocaine base (equivalent to 5.0 mg. of lidocaine hydrochloride) | 4.5 |
| Creatinine | 8 |
| Sodium bisulfite | 2 |
| Sequestrene disodium | 0.5 |
| Methylparaben (methylparahydroxybenzoate) | 1.5 |
| Propylparaben (propylparahydroxybenzoate) | 0.5 |
| Hydrochloric acid about | 3 |
| Sodium hydroxide | q.s. to pH 6.0–6.5 |
| Water for injection to make 1 cc. | |

Example 5

The following example shows a solution containing mepivacaine instead of lidocaine.

| | | |
|---|---|---|
| Dexamethasone phosphate | mg | 2 |
| Mepivacaine HCl | mg | 5 |
| Sodium bisulfite | mg | 1 |
| Versene disodium (sequestrene disodium) | mg | 0.05 |
| Sodium citrate | gram | 1.0 |
| HCl or NaCH | q.w. to pH | 6.0–6.5 |
| Methylparaben | mg | 1.7 |
| Water for injection to make | ml | 1.0 |

All of the ingredients except the mepivacaine hydrochloride are dissolved in 80% of the final volume of recently boiled, nitrogen flushed and cooled water for injection. The pH is adjusted to between 6.0 and 6.5 with acid or alkali and the mepivacaine hydrochloride is dissolved in this vehicle. The pH is again adjusted, if necessary, and the solution filtered through a sterilizing filter, such as Selas 03. The bulk is then aseptically subdivided into ampuls or vials.

Example 6

Another solution containing mepivacaine is as follows:

| | | |
|---|---|---|
| Dexamethasone phosphate | mg | 4 |
| Mepivacaine HCl | mg | 10 |
| Sodium bisulfite | mg | 1.0 |
| Versene disodium (sequestrene disodium) | mg | 0.05 |
| Sodium citrate | gram | 1.0 |
| Methylparaben | mg | 1.7 |
| HCl or NaOH | q.s. to pH | 6.0–6.5 |
| Water for injection to make | ml | 1.0 |

This solution is prepared the same as that given in Example 5.

Example 7

The following table illustrates the relative proportions of dexamethasone and lidocaine base, or dexamethasone and mepivacaine, which vary from 1–20 parts by weight of dexamethasone to 5–20 parts by weight of lidocaine base, or, in the case of mepivacaine, preferably 1–10 mg. per ml. when the dexamethasone 21-phosphate is present in a concentration of 1–10 mg./ml.

Parts by weight

| Dexamethasone 21-phosphate | Lidocaine base or Mepivacaine (HCl) |
|---|---|
| 1 | 5 |
| 1 | 10 |
| 1 | 15 |
| 1 | 20 |
| 5 | 5 |
| 5 | 10 |
| 5 | 15 |
| 5 | 20 |
| 10 | 5 |

| Parts by weight | |
|---|---|
| Dexamethasone 21-phosphate | Lidocaine base or Mepivacaine (HCl) |
| 10 | 10 |
| 10 | 15 |
| 10 | 20 |
| 15 | 5 |
| 15 | 10 |
| 15 | 15 |
| 15 | 20 |
| 20 | 5 |
| 20 | 10 |
| 20 | 15 |
| 20 | 20 |

Example 8

| | Weight in milligrams, per milliliter of solution |
|---|---|
| Dexamethasone 21-phosphate (expressed as disodium salt) | 4 |
| Lidocaine base (equivalent to 10 mg. of lidocaine hydrochloride) | 8.93 |
| Creatinine | 8 |
| Sodium bisulfite | 2 |
| Sequestrene disodium | 0.5 |
| Phenol | 5.0 |
| Sodium hydroxide | 6.0 |
| Hydrochloric acid | 5.2 |
| Water for injection, to | 1 |
| Epinephrine hydrochloride (ratio 1–100,000) | .01 |

The epinephrine hydrochloride serves as a vasoconstrictor, prolonging the effectiveness of the combined dexamethasone and lidocaine hydrochloride.

Example 9

| | Weight in milligrams, per milliliter of solution |
|---|---|
| Prednisolone phosphate | 4 |
| Lidocaine base (equivalent to 10 mg. of lidocaine hydrochloride) | 8.93 |
| Creatinine | 8 |
| Sodium bisulfite | 2 |
| Sequestrene disodium | 0.5 |
| Phenol | 5.0 |
| Sodium hydroxide | 6.0 |
| Hydrochloric acid | 5.2 |
| Water for injection, to 1 mg. | |

In Example 9, the quantity of prednisolone phosphate can be increased to 20 mg. if desired.

Example 10

| | Weight in milligrams, per milliliter of solution |
|---|---|
| Hydrocortisone phosphate (as disodium salt) | 4 |
| Lidocaine base (equivalent to 10 mg. of lidocaine hydrochloride) | 8.93 |
| Creatinine | 8 |
| Sodium bisulfite | 2 |
| Sequestrene disodium | 0.5 |
| Phenol | 5.0 |
| Sodium hydroxide | 6.0 |
| Hydrochloric acid | 5.2 |
| Water for injection, to 1 ml. | |

In Example 10, the quantity of hydrocortisone phosphate can be increased to 50 mg. if desired.

It will also be appreciated that the lidocaine may be used either as lidocaine base, as lidocaine hydrochloride, or in any equivalent form all of which are intended to be included herein.

In the above Examples 8–10, an equal weight of mepivacaine hydrochloride may be substituted for the lidocaine (hydrochloride). Also, in any of the examples, instead of the designated steroid, there may be substituted any one of the other compounds identified by the structural formula above.

Not only are solutions, when prepared according to this invention, stable for long periods of time but they act quickly when administered. This is in sharp contrast to combinations of the other recognized anesthetics such as procaine and cyclaine, for example, which react chemically with the dexamethasone phosphate, forming a water-insoluble precipitate which, though gradually hydrolyzable within the human body, is not injected in the immediately available solution form.

From the foregoing examples it will be appreciated that this invention is applicable not only to the specific steroid $16\alpha$-methyl-$9\alpha$-fluoro-1, 4-pregnadiene-$11\beta$, $17\alpha$, 21-triol-3, 20-dione 21-phosphate but also to the equivalent adrenocortical steroids having the 21-hydroxide esterified with phosphoric acid. These would include not only the specific steroids set forth herein but also such steroids as prednisolone phosphate, hydrocortisone phosphate and the equivalents.

What is claimed is:

1. A clear, injectable solution consisting essentially of water, about 5–20 parts by weight of a compound selected from the group consisting of lidocaine and mepivacaine and about 1–20 parts by weight of a compound represented as:

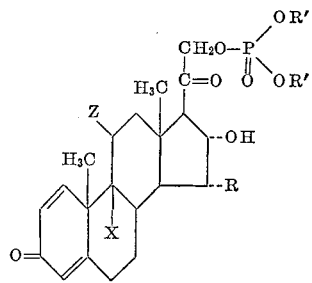

wherein X is selected from the group consisting of hydrogen and fluorine, Z is selected from the group consisting of keto and hydroxy, R is selected from the group consisting of hydrogen and methyl and $R^1$ is selected from the group consisting of hydrogen and sodium.

2. An aqueous solution consisting essentially of the 21-phosphate of $16\alpha$-methyl-$9\alpha$-fluoro-1,4-pregnadiene-$11\beta$, $17\alpha$, 21-triol-3,20-dione and an aromatic amide selected from the group consisting of mepivacaine and lidocaine, in parts by weight having a ratio in the range of from 1–20 to 4–1.

3. An aqueous solution consisting essentially of the 21-phosphate of $16\alpha$-methyl-1, 4-pregnadiene-$11\beta$, $17\alpha$, 21-triol-3, 20-dione and an aromatic amide selected from the group consisting of mepivacaine and lidocaine, in parts by weight having a ratio in the range of from 1–20 to 4–1.

4. An aqueous solution consisting essentially of the 21-phosphate of $16\alpha$-methyl-1, 4-pregnadiene-$17\alpha$, 21-diol-3, 11, 20-trione and an aromatic amide selected from the group consisting of mepivacaine and lidocaine, in parts by weight having a ratio in the range of from 1–20 to 4–1.

5. An aqueous solution consisting essentially of the 21-phosphate of $16\alpha$-methyl-1, 4-pregnadiene-$11\beta$, $17\alpha$, 21-triol-3, 20-dione and an aromatic amide selected from the group consisting of mepivacaine and lidocaine, in parts by weight having a ratio in the range of from 1–20 to 4–1.

6. An aqueous solution consisting essentially of the 21-phosphate of $16\alpha$-methyl-$9\alpha$-fluoro-1, 4-pregnadiene-$17\alpha$, 21-diol-3, 11, 20-trione and an aromatic amide selected from the group consisting of mepivacaine and lidocaine, in parts by weight having a ratio in the range of from 1–20 to 4–1.

7. An aqueous solution consisting essentially of 21- phosphate of 11β, 17α, 21-trihydroxy-4-pregnene-3, 20-dione, and an aromatic amide selected from the group consisting of mepivacaine and lidocaine, in parts by weight having a ratio in the range of from 1–20 to 4–1.

8. An aqueous solution consisting essentially of the 21-phosphate of 17α, 21-dihydroxy-4-pregnene-3,11,20-trione, and an aromatic amide selected from the group consisting of mepivacaine and lidocaine, in parts by weight having a ratio in the range of from 1–20 to 4–1.

9. An aqueous solution consisting essentially of the 21-phosphate of 11β, 17α, 21-trihydroxy-1, 4-pregnadiene-3, 20-dione, and an aromatic amide selected from the group consisting of mepivacaine and lidocaine, in parts by weight having a ratio in the range of from 1–20 to 4–1.

10. An aqueous solution consisting essentially of the 21-phosphate 17α, 21-dihydroxy-1,4-pregnadiene-3,11,20-trione, and an aromatic amide selected from the group consisting of mepivacaine and lidocaine, in parts by weight having a ratio in the range of from 1–20 to 4–1.

11. A clear, injectable solution consisting essentially of the following ingredients in the quantities stated:

| | Weight in milligrams, per milliliter of solution |
|---|---|
| Dexamethasone 21-phosphate disodium salt | 4 |
| Lidocaine base | 8.93 |
| Creatinine | 8 |
| Sodium bisulfite | 2 |
| Ethylenediaminetetra-acetic acid disodium | 0.5 |
| Phenol | 5.0 |
| Sodium hydroxide | 6.0 |
| Hydrochloric acid | 5.2 |
| Water for injection, to 1 ml. | |

12. A clear, injectable solution consisting essentially of the following ingredients in the quantities states:

| | | |
|---|---|---|
| Dexamethasone 21-phosphate | mg | 2 |
| Mepivacaine HCl | mg | 5 |
| Sodium bisulfite | mg | 1 |
| Ethylenediaminetetra-acetic acid disodium | mg | 0.05 |
| Sodium citrate | gram | 1.0 |
| pH | | 6.0–6.5 |
| Methylparaben | mg | 1.7 |
| Water for injection to make | ml | 1.0 |

References Cited

UNITED STATES PATENTS 2,975,097    3/1961    Modderno _____ 167—52

ALBERT T. MEYERS, *Primary Examiner.*

JULIAN S. LEVITT, *Examiner.*

J. D. GOLDBERG, *Assistant Examiner.*